Figure 1:
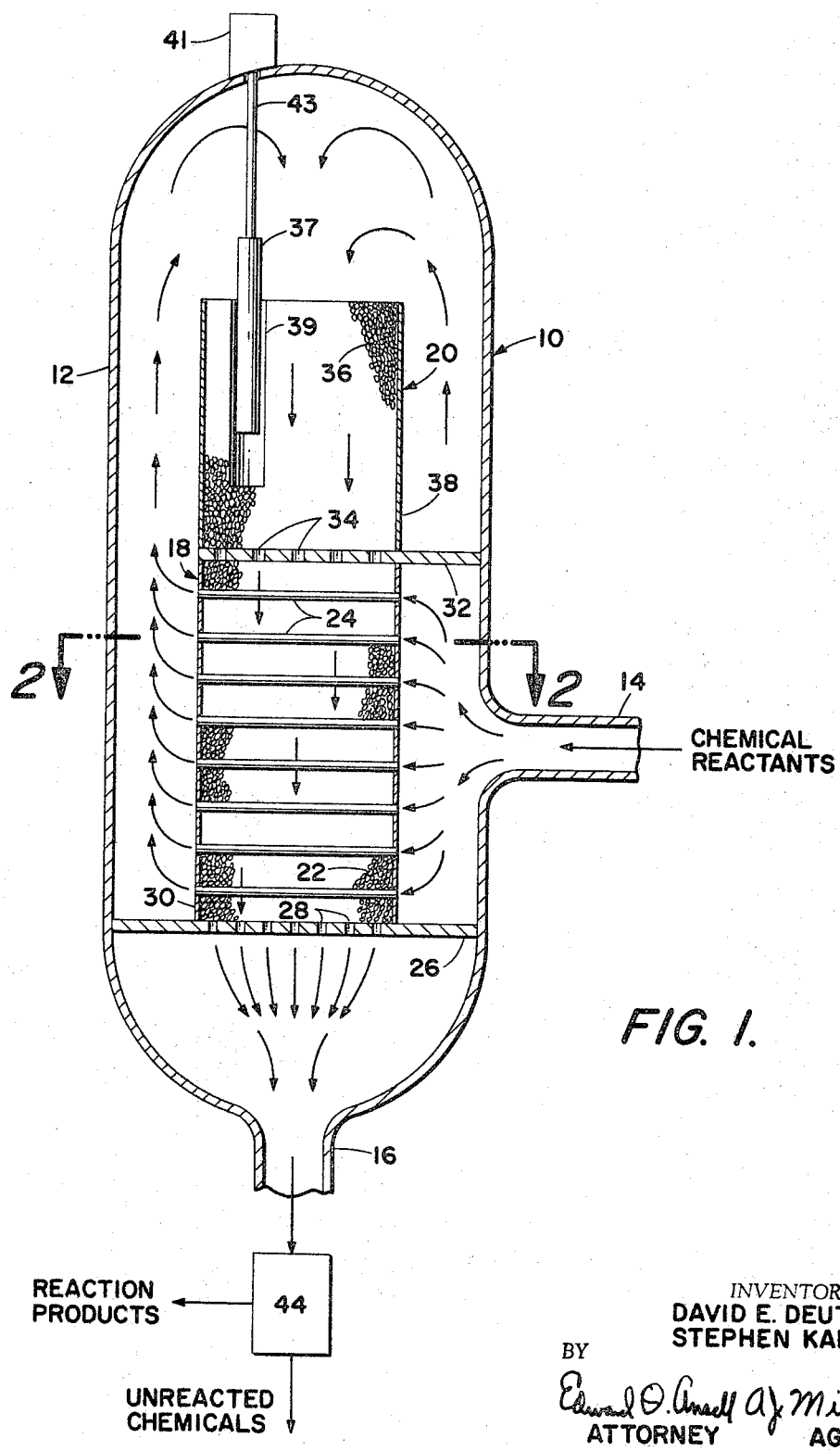

INVENTOR.
DAVID E. DEUTSCH
STEPHEN KAHN

Aug. 1, 1967  D. E. DEUTSCH ET AL  3,334,020
NUCLEAR REACTOR FOR PRODUCING CHEMICAL REACTIONS
Filed Nov. 6, 1964  2 Sheets-Sheet 2

INVENTOR.
DAVID E. DEUTSCH
STEPHEN KAHN
BY
ATTORNEY  AGENT

United States Patent Office 3,334,020
Patented Aug. 1, 1967

3,334,020
NUCLEAR REACTOR FOR PRODUCING
CHEMICAL REACTIONS
David E. Deutsch, Walnut Creek, and Stephen Kahn, Lafayette, Calif., assignors, by mesne assignments, to Aerojet-General Corporation, El Monte, Calif., a corporation of Ohio
Filed Nov. 6, 1964, Ser. No. 409,454
3 Claims. (Cl. 176—39)

This invention generally relates to high temperature chemical reaction processes and more particularly to a novel high temperature chemical reaction process utilizing the energy of nuclear fission fragments to initiate the reaction and to a novel nuclear reactor for producing high temperature chemical reactions initiated by nuclear fission fragments.

There are many chemical reactions which require the addition of heat in order to proceed with measurable rapidity. Certain disassociation reactions are well recognized to fall into this category. Thus, for example, the disruption of the molecular bonds in nitrogen requires the attainment of very high temperatures, for the strength of the molecular nitrogen-nitrogen bonds far exceed the molecular bonds of other gases. Specifically, the production of nitric oxide from air, $N_2+O_2 \rightleftharpoons 2NO$, which involves the breaking of a nitrogen-nitrogen bond, requires a temperature above 2000° C. followed by a very rapid quench to prevent recombination of the nitrogen. Considerable difficulty is encountered in attaining this extreme temperature due to the near impossible requirements placed upon the containment materials.

This difficulty has been amply demonstrated in the "Wisconsin process" which depends entirely upon heat to fix nitrogen. In this process, atmospheric air is heated above 2200° C. in a regenerative furnace containing two heat exchangers of refractory pebbles. At these temperatures, the nitrogen and oxygen of the air combine to form about 2% of nitric oxide, the degree of conversion being determined by the gas decomposition and temperature. In its travel through the furnace, air is preheated in the first pebble bed, then heated to reaction temperature by the addition of methane or other fluid fuel to the air in an intermediate combustion zone; the combustion gases are then cooled to nearly room temperature in the second pebble bed.

The cooling must be accomplished with extreme rapidity, 20,000° C. per second or more, in order to prevent dissociation of the nitric oxide which is formed in the combustion zone. After the furnace is operated for a few minutes the flow of air is reversed and the second pebble bed becomes the preheating bed while the first bed, cooled by the incoming air, becomes the chilling bed. This alternation of the flow of air is continued throughout operation of the furnace. Sustained production of nitric oxide has not, however, been obtained due to deterioriation of the refractory furnace lining. Additional detailed information relating to the "Wisconsin process" can be obtained from Industrial & Engineering Chemistry, vol. 45, No. 12, p. 2611, December 1953, "Fixation of Atmospheric Nitrogen in a Gas Heated Furnace," Hendrickson, W. G., and Daniels, F., and also vol. 40, No. 9, p. 1719, September 1948, "Fixation of Atmospheric Nitrogen in a Gas Heated Furnace," Gilbert, N., and Daniels, F.

To overcome the difficulties which extreme temperatures create, nuclear fission fragment energy has been proposed to carry out these endothermic chemical reactions. It is well known that approximately 84% of the 200 million electron volts of energy produced by a single nuclear fission appears as kinetic energy of the primary fission products or fission fragments. As used herein, the terms "primary fission products" or "fission fragments" have the meaning given in Glasstone, S., Principles of Nuclear Reactor Engineering, Princeton, N.J., D. Van Nostrand, 1955, pp. 18, 19 and 115. Thus "fission fragments" are defined as the *nuclei* formed *directly* in fission and are to be distinguished from "fission products" which include the various species, including beta particles and gamma rays, formed by the radioactive decay of fission fragments. Since the fission fragments from a nuclear fission have an electron deficiency, they will expend their energy in the disruption of molecules as they pass through a fluid moving at speeds on the order of $10^9$ cm./sec. These disrupted molecules are ionized so that it is conventional to refer to the path of fission fragments as an ionization track. Along this ionization track there is provided an effective temperature of about 10,000 degrees Kelvin, and by the utilization of this temperature to carry out chemical reactions it is possible to efficiently and advantageously accomplish endothermic chemical reactions. Inasmuch as normal molecular collisions in the fluid will transfer local excess energy out of the ionization track and into the surrounding fluid extremely rapidly, there is an almost instantaneous quenching of the reaction. This quenching can maintain a relatively low, e.g., 100° C. over-all temperature of the fluid.

Because of their large mass, between mass numbers 80 and 155, and their high charge, some 20–22 positive charges, the ionization obtainable from the fission fragments is quite high. These same factors, however, limit the distance which the fission fragments can travel from their point of origin, the nuclear fission. This distance, commonly referred to as the range, has been found to be about 1.9 to 2.5 cm. in air and correspondingly less in more dense materials. For example, their range is known to be about $1.4 \times 10^{-3}$ cm. in aluminum.

In order to effectively utilize fission fragment energy to produce chemical reactions, it is necessary that the deposition efficiency of the fragments into the chemical reactants be reasonably high, i.e., over 50%. The form of the fissionable material, the source of the fission fragments, must be of a configuration which permits the majority of fission fragments to escape from the material and not be absorbed therein. Existing fabrication techniques do not however permit fixed fuel configurations with such extremely thin cross-sections (less than 20 microns) necessary to achieve this efficiency. Thus, chemical reactions cannot be efficiently produced relying solely upon fission fragment energy from a fixed fuel form.

It is an object of the present invention to provide a novel high temperature chemical reaction process utilizing the energy of nuclear fission fragments to initiate the chemical reaction.

Another object of the present invention is to provide a novel nuclear reactor for producing high temperature chemical reactions initiated by nuclear fission fragments.

The novel high temperature chemical reaction process of the present invention comprises the steps of (1) heating the chemical reactants to a high temperature but below that required for the reaction and one at which the reactants can still be contained by conventional materials, and (2) exposing the heated chemical reactants to nuclear fission fragments to induce the reaction. Although listed as two separate steps, the operations will not be distinct since at least a portion of the heat required to raise the temperature of the reactants will be supplied from the nuclear reaction which also furnishes the fission fragments.

The novel nuclear reactor for producing high temperature chemical reactions comprises a reactor core of relatively thin, unclad neutron fissionable material and means for circulating chemical reactants through the reactor core so as to heat the reactants to a temperature below their reaction point and subject them to nuclear fission fragments to induce the chemical reaction. A counter current heat exchanger can be utilized to concurrently heat the incoming reactants and cool the resultant reaction products.

In this manner extreme reaction temperatures can be avoided, thus permitting the use of conventional containment materials. On the other hand, extremely thin fuel forms are not required since only a reasonable amount of fission fragments are needed to induce the chemical reaction and the remainder can produce heat.

Figure 2:
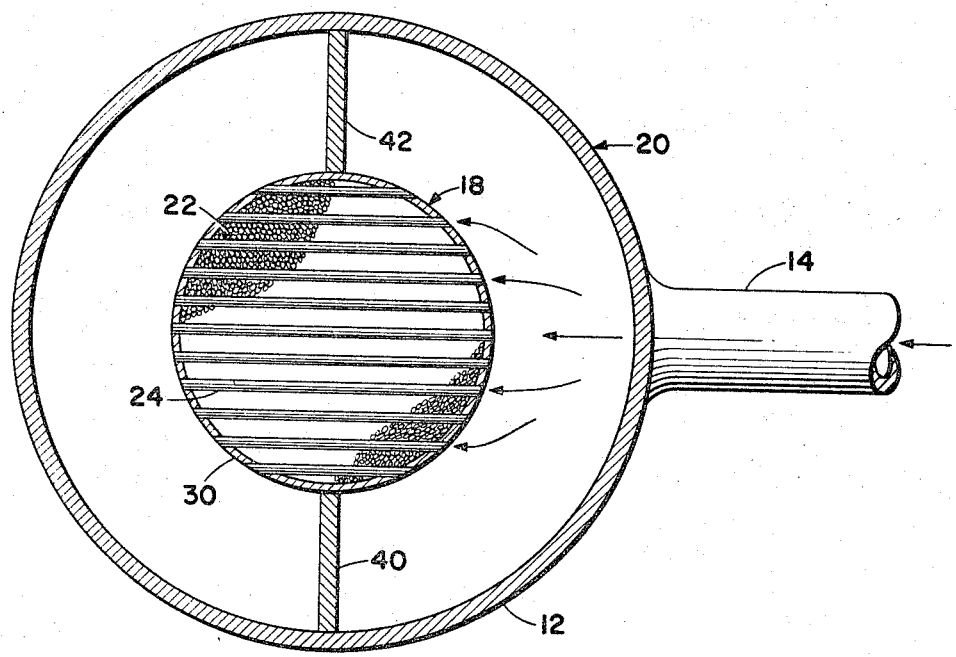

These and other objects, advantages and features of the present invention will be apparent to those skilled in the art from the following description taken together with the appended drawings, wherein:

FIG. 1 is a schematic illustration of the nuclear reactor of the present invention and showing the reactor in vertical section; and FIG. 2 is a cross-sectional view of the nuclear reactor of FIG. 1 taken along line 2—2 of FIG. 1.

Considering first the improved chemical reaction process of the present invention, the process herein described is particularly directed to the economic and advantageous accomplishment of high temperature endothermic chemical reactions. A great number of these endothermic reactions require such extremely high temperatures to sustain them that materials are not available to contain the reactants, particularly over extended periods of time. Thus existing containment materials severely restrict if not prevent certain of these reactions.

Directly associated with this problem of high temperature reactions is the extreme reactivity of the reactants at such temperatures. In order to terminate the chemical reaction at a desired point to attain particular chemical compounds therefrom, it is necessary to rapidly lower the temperature of the reactants so as to prevent further and undesirable reactions. This rapid lowering of the reaction temperature, or quenching as it is commonly called, is oftentimes very difficult to achieve.

The chemical reaction process of the present invention requires the heating of the chemical reactants to a high temperature but one which is below the reaction temperature and can be contained by conventional materials. Depending upon the reactants used and the particular reaction desired, temperatures between 1000 and 2000 degrees C. are appropriate. A nuclear reactor is ideally suited to achieve temperatures in the order.

In a conventional nuclear reactor, the great majority, over 90%, of the kinetic energy of the nuclear fission fragments (160,000,000 electron volts per fission) will appear as heat since the fission fragments are confined within the nuclear material. With a flow through process, the temperature of the coolant or chemical reactants will depend upon the power level of the reactor and the flow rate of the stream.

If, however, the neutron fissionable material of the nuclear reactor, either uranium or plutonium, is unclad and thus permits some of the fission fragments to enter the coolant or reactant stream, certain of their kinetic energy will go to the disruption of chemical bonds. The number of fission fragments available for this purpose can be enhanced by providing the fissionable material in a relatively thin form, i.e., between 20–50 microns in cross sectional thickness. Extremely thin fuel forms, less than 20 microns, are not required, however, since the chemical reaction is not entirely dependent upon the kinetic energy of the fission fragments but merely utilizes them to initiate, enhance or boost the high temperature chemical reaction. The chemical reaction thus proceeds as a result of the combined effects of high temperature and fission fragment kinetic energy, neither of which alone can efficiently produce the reaction.

Since the fission fragments which dissipate their kinetic energy producing endothermic chemical reactions, i.e., by rupturing chemical bonds, do not appreciably raise the over-all or bulk temperature, the instantaneous quenching effect resulting from a fission fragment induced reaction is not lost. The chemical reaction products which remain below their decomposition temperature are effectively stabilized. A reduction in temperature of the process stream after leaving the reactor core ensures retention of the desired reaction products. Separation and decontamination of the reaction products and recycling of the reaction stream would complete a continuous process.

Specifically, the fixation of nitrogen is ideally suited to the novel high temperature chemical reaction process of the present invention. The temperature of air required to produce nitric oxide, i.e., 2200° C. cannot readily be contained with conventional materials. On the other hand, the reaction cannot economically be produced solely from fission fragment effects since extremely thin (less than 20 micron) fixed fuel forms are not presently available and without which there cannot be significant process efficiencies.

The air or the other nitrogen-oxygen mixture is heated to a temperature on the order of 1500° C. in a nuclear reactor which also submits the air to the effects of some of the nuclear fission fragments. While the air does not exceed a bulk temperature of 1500° C. the fission fragments produce temperatures about 10,000 degrees Kelvin along their ionization tracks which is sufficient to induce the fixation of the nitrogen. The rapid lowering of this ionization track temperature by molecular collision with the surrounding medium quenches the reaction and in effect "freezes" the fixed nitrogen.

FIGS. 1 and 2 illustrate the novel nuclear reactor suitable for carrying out the process of the present invention. The reactor 10 includes a pressure vessel 12 having an inlet opening 14 and outlet opening 16. The vessel 12, of a structural material such as steel must be fabricated to contain reasonable internal pressures.

Supported within the pressure vessel 12 are a counter current heat exchanger 18 and the reactor core 20. The heat exchanger 18, which may in some circumstances be situated outside of the reactor pressure vessel 12, consists of a bed 22 of refractory metal pebbles through which passes a plurality of tubes 24. The tubes 24 receive chemical reactants from the pressure vessel inlet 14 for passage through the pebble bed 22. The heat exchanger 18 is supported in the lower region of the pressure vessel 12 on a support plate 26. Openings in the support plate 26 permits the chemical reactants and reactor products to communicate with the pressure vessel outlet 16 after passage through the pebble bed 22. The bed 22 is enclosed by a cylindrical container 30 which provides openings for the tubes 24 to pass through. The pebbles which make up the bed are of a high temperature refractory material, such as magnesium oxide and have a particular size range from ¼" to 2".

The reactor core 20 is supported above the heat exchanger 18 on a second support plate 32. Openings 34 in the second support plate 32 permit passage of the reactants between the reactor core 20 and the heat exchanger 18. The core 20 comprises a pebble bed 36 enclosed within a second container 38. The bed 36 would be a critical mass of unclad fissionable material compound pebbles, 3 microns to 100 microns, such as uranium oxide. A control rod or blade 37 of neutron absorbing material, operable within a vertical extending control blade sheath 39 in the reactor core 20, will regulate the nuclear fission. The control blade 37 is suspended from a control blade drive 41 mounted on top of the reactor pressure vessel 12 by means of a connecting rod 43.

Two divider plates 40 and 42, on either side of the heat exchanger 18, extend between the lower support plate 26 and the upper support plate 32 to provide a plenum chamber for receiving chemical reactants from the pressure vessel inlet 14 and directing them into the tubes 24 of the pebble bed heat exchanger 18. The reactants, after initial heating in the heat exchanger 18, are directed through the reactor core 20 where they are further heated and subjected to nuclear fission fragments. The reactants, plus the reaction products, are then passed through the pebble bed 22 of the heat exchanger 18 and then out of the reactor vessel 10 through the outlet 16. A separator 44, illustrated schematically, will remove the reaction products from the unreacted chemicals.

To produce fixed nitrogen, the reactor 10 receives air, a mixture of nitrogen and oxygen, under slight pressure, at the pressure vessel inlet 14. This air, preheated to approximately 350° C. before being admitted to the vessel 12, is directed into the tubes 24 of the heat exchanger 18 which pass through the pebble bed 22. The pebble bed 22 which receives the exhaust from the reactor core 20 will raise the temperature of the air to approximately 1200° C. at the exit of the tubes 24.

The temperature of the air is raised further, to approximately 1300° C., as it passes around the reactor core 20 and before it enters the top of the core 20. The fissionable material pebble bed 36 of the reactor core 20 will be undergoing nuclear fission and producing fission fragments, some of which will expend energy heating their surroundings. The bed will be maintained at a temperature in excess of 1500° C. by this process. In addition, a portion of the fission fragments produced by the fission reaction will be free to utilize their energy into the heated air passing through the bed 36. Thus, as the air passes through the reactor core 20 it is heated to approximately 1500° C. and subjected to free fission fragments.

Under these circumstances the molecular nitrogen and oxygen in the air will disassociate into nitrogen and oxygen atoms respectively which will in turn combine into nitric oxide according to the following reaction; $N_2 + O_2 \rightarrow 2NO$. Although this chemical reaction is reversible, under the described conditions it will proceed more rapidly in the direction shown above.

Immediately upon leaving the reactor core 20, the mixture of nitrogen, oxygen, and nitric oxide enters the cross current heat exchanger 18 where it passes directly through the pebble bed 22. This mixture is rapidly quenched as it passes through the pebble bed 22 which gives up heat to the incoming air in the tubes 24. Cooling of the nitric oxide in an excess of air will result in part of the nitric oxide reacting with oxygen as follows, $2NO + O_2 \rightarrow 2NO_2$. Thus, a mixture of nitrogen, oxygen, nitric oxide, and nitrogen dioxide at approximately 800° C. will emerge from the heat exchanger 18 and out of the reactor 10 through the pressure vessel outlet 16.

The residual heat of the mixture can be discharged to a heat sink or utilized for some related useful purpose. The fixed nitrogen, in the form of NO or $NO_2$ can be recovered by conventional separation processes, such as scrubbing with water. Any radioactive contamination can be removed from the fixed nitrogen product by such processes as selective distillation, scrubbing, etc. The preferred product is pure nitrogen dioxide gas which can in turn be combined with air and water in the conventional manner to produce nitric acid.

Another example of nitrogen fixation which can be achieved by the process and reactor described above is the bonding of nitrogen with organics to form compounds which contain carbon-nitrogen bonds attached to various other radicals. In addition, nitrogen may be combined directly with finely divided forms of coal or with coal gasification products. In certain applications, namely fertilizers, fixed nitrogen having a carbon-nitrogen bond may have greater utility than fixed nitrogen having an oxygen-nitrogen bond.

While specific embodiments of the invention have been illustrated and described, it is to be understood that these embodiments are by way of example only, and that the invention is not to be construed as being limited thereto, but only by the proper scope of the appended claims.

What is claimed is:

1. An improved nuclear reactor for producing high temperature endothermic chemical reactions comprising:
    (a) a pressure vessel having inlet and outlet openings;
    (b) a reactor core of relatively thin unclad neutron fissionable material in a critical mass mounted within said pressure vessel;
    (c) means for controlling the neutron fission of said reactor core;
    (d) a counter flow heat exchanger mounted within said pressure vessel and operably associated with said reactor core; and
    (e) means for circulating chemical reactants through one side of said heat exchanger, through said reactor core where the chemical reactants are heated to a high temperature below their reaction temperature and exposed to nuclear fission fragments to initiate the chemical reaction, and finally through the other side of said heat exchanger where the unreacted chemicals and reaction products are cooled.

2. An improved nuclear reactor of claim 1 wherein said reactor core comprises a bed of fissionable material pebbles having an individual pebble diameter less than 100 microns.

3. An improved nuclear reactor for producing high temperature endothermic chemical reactions comprising:
    (a) a pressure vessel having inlet and outlet openings;
    (b) a reactor core of neutron fissionable pebbles mounted in a critical mass within said pressure vessel;
    (c) means for controlling the neutron fission of said reactor core;
    (d) a pebble bed heat exchanger mounted within said pressure vessel and operably associated with said reactor core; and
    (e) means for circulating chemical reactants through one side of said heat exchanger where the reactants are heated, through said reactor core where the reactants are further heated and exposed to nuclear fission fragments to initiate the chemical reaction, and finally through the other side of said heat exchanger where the reaction products and unreacted chemicals are cooled.

References Cited

UNITED STATES PATENTS

| 3,070,530 | 12/1962 | Metcalf | 176—60 X |
| 3,154,473 | 10/1964 | Martin | 176—39 X |
| 3,228,848 | 1/1966 | Fellows | 176—16 X |

FOREIGN PATENTS 1,345,745  11/1963  France.

OTHER REFERENCES

February 1961, Nucleonics, pp. 48, 49, 50.

REUBEN EPSTEIN, *Primary Examiner.*